US012323951B2

(12) United States Patent
Alasti et al.

(10) Patent No.: US 12,323,951 B2
(45) Date of Patent: Jun. 3, 2025

(54) ROBUST GRANT-FREE TRANSMISSIONS

(71) Applicant: DISH Wireless L.L.C., Littleton, CO (US)

(72) Inventors: Mehdi Alasti, Arlington, VA (US); Siddhartha Chenumolu, Ashburn, VA (US); Mariam Sorond, Reston, VA (US)

(73) Assignee: DISH Wireless L.L.C., Littleton, CO (US)

( * ) Notice: Subject to any disclaimer, the term of this patent is extended or adjusted under 35 U.S.C. 154(b) by 0 days.

(21) Appl. No.: 18/653,143

(22) Filed: May 2, 2024

(65) Prior Publication Data
US 2024/0284409 A1 Aug. 22, 2024

Related U.S. Application Data

(63) Continuation of application No. 18/147,534, filed on Dec. 28, 2022, now Pat. No. 12,010,657, which is a continuation of application No. 17/391,436, filed on Aug. 2, 2021, now Pat. No. 11,570,758, which is a continuation of application No. 16/410,889, filed on May 13, 2019, now Pat. No. 11,109,352.

(60) Provisional application No. 62/754,075, filed on Nov. 1, 2018.

(51) Int. Cl.
H04W 72/02 (2009.01)
H04J 11/00 (2006.01)
H04L 1/1867 (2023.01)
H04W 72/044 (2023.01)
H04W 72/1263 (2023.01)
H04W 84/04 (2009.01)

(52) U.S. Cl.
CPC .......... *H04W 72/02* (2013.01); *H04J 11/004* (2013.01); *H04L 1/189* (2013.01); *H04W 72/044* (2013.01); *H04W 72/1263* (2013.01); *H04W 84/042* (2013.01)

(58) Field of Classification Search
USPC ....... 370/216, 229, 230, 241, 242, 252, 328, 370/329, 330, 458, 468
See application file for complete search history.

(56) References Cited

U.S. PATENT DOCUMENTS

| | | | |
|---|---|---|---|
| 2018/0123765 A1* | 5/2018 | Cao | H04L 1/1819 |
| 2018/0279315 A1* | 9/2018 | Salem | H04L 5/0091 |
| 2020/0015263 A1* | 1/2020 | Huang | H04W 72/0446 |
| 2020/0036481 A1* | 1/2020 | Chen | H04L 1/1812 |

(Continued)

*Primary Examiner* — Nguyen H Ngo
(74) *Attorney, Agent, or Firm* — Kilpatrick Townsend & Stockton LLP

(57) ABSTRACT

Various arrangements for performing grant-free uplink transmissions are presented herein. A user equipment (UE) can determine data that is to be transmitted using a grant-free uplink transmission to a base station of a cellular network. Three or more grant-free transmission blocks may be selected by the UE. The same data payload may be transmitted on each grant-free transmission block. The first grant-free transmission block can indicate the end of a chain of linked grant-free transmissions and have a pointer that references the second grant-free transmission block. The second grant-free transmission can include pointers that refer to the first grant-free transmission block and a third grant-free transmission block.

20 Claims, 9 Drawing Sheets

(56) References Cited

U.S. PATENT DOCUMENTS

2021/0037537 A1     2/2021    Stathakis et al.
2021/0250993 A1     8/2021    Li et al.

\* cited by examiner

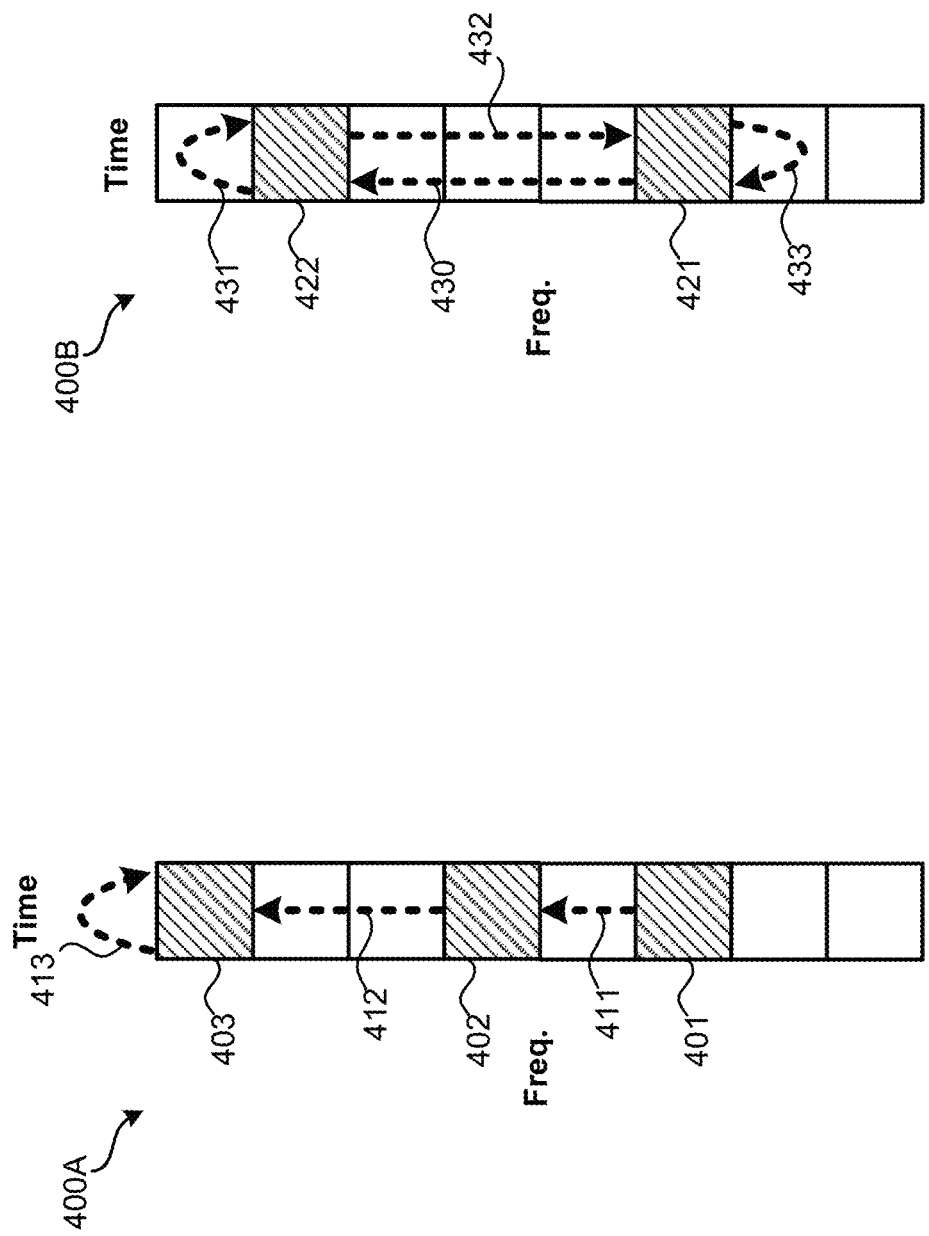

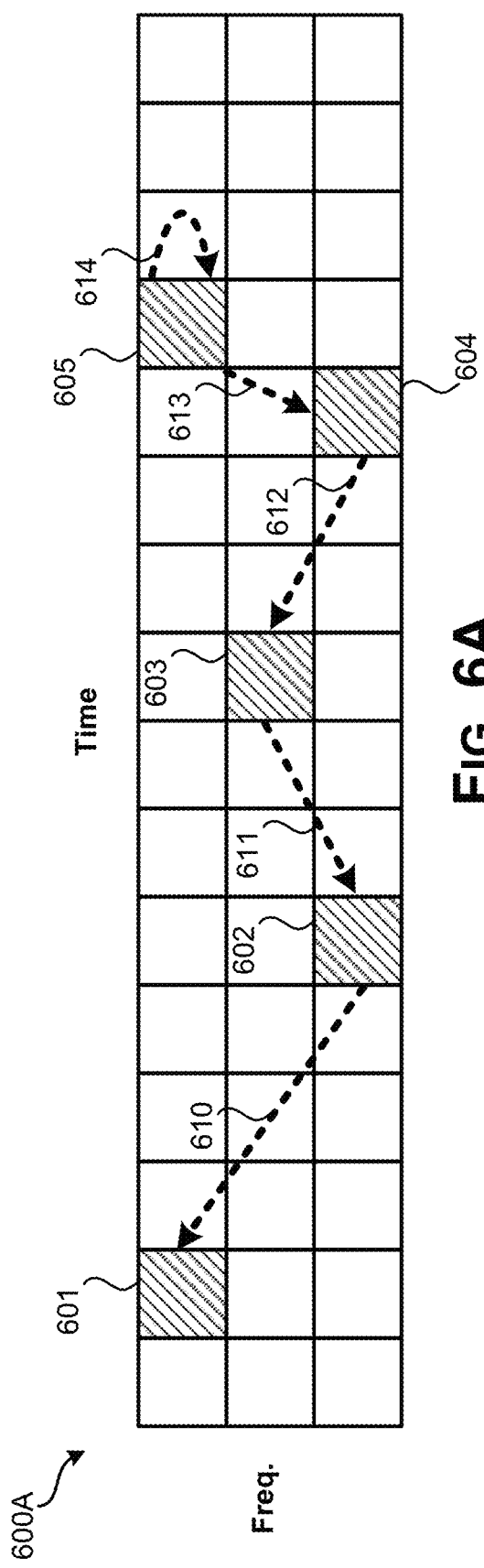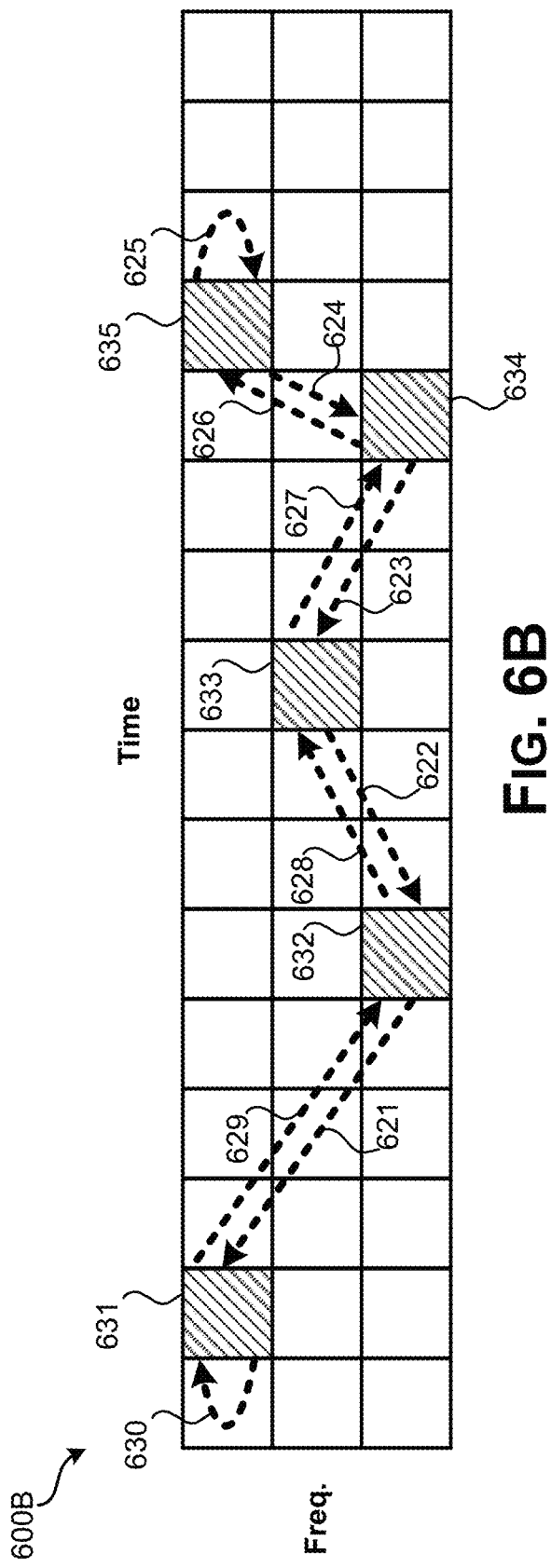
FIG. 6A
FIG. 6B

ROBUST GRANT-FREE TRANSMISSIONS

CROSS-REFERENCES TO RELATED APPLICATIONS

This application is a continuation of U.S. patent application Ser. No. 18/147,534, filed Dec. 28, 2022, entitled "ROBUST GRANT-FREE TRANSMISSIONS," which is a continuation of U.S. patent application Ser. No. 17/391,436, filed Aug. 2, 2021, now issued as U.S. Pat. No. 11,570,758, entitled "ROBUST GRANT-FREE TRANSMISSIONS," which is a continuation of U.S. patent application Ser. No. 16/410,889, filed May 13, 2019, now issued as U.S. Pat. No. 11,109,352, entitled "ROBUST GRANT-FREE TRANSMISSIONS," which claims priority to U.S. Provisional Patent Application No. 62/754,075, filed on Nov. 1, 2018, entitled "ROBUST GRANT-FREE TRANSMISSIONS," the disclosures of which are hereby incorporated by reference in their entirety for all purposes.

BACKGROUND

Grant-free (GF) transmissions allow for user equipment (UE) to transmit data packets at defined times on defined frequencies (e.g., sub-carriers of OFDM physical resource blocks) without first requesting and receiving a reservation with a base station. Such grant-free transmissions decrease the amount of communication delay and overhead required to schedule a data transmission from the UE to a base station. However, since the frequency and time slot is not reserved for the UE, it is possible that a second UE will transmit data on the same frequency and during the same time slot. When two UEs transmit at the same time on the same frequency, a collision results, which may typically prevent the base station from successfully receiving data transmitted by either UE as part of the collision.

SUMMARY

Various arrangements for performing uplink grant-free transmissions are presented herein. An instance of user equipment may determine that data that is to be transmitted using a grant-free uplink transmission to a base station of a cellular network. A first grant-free resource block may be selected. A plurality of grant-free resource blocks can define a plurality of sets of subcarrier frequencies, a plurality of timeslots, or both for data to be transmitted to the base station of the cellular network without a reservation. selecting, by the instance of user equipment, a second grant-free resource block. A grant-free transmission may be transmitted by the UE instance that includes a data payload and a first pointer at the first grant-free resource block. The first pointer can refer to the second grant-free resource block.

Embodiments of such an arrangement can include one or more of the following features: The first grant-free resource block and the second grant-free resource block can occur during a same timeslot on different frequencies. The first grant-free resource block and the second grant-free resource block can occur during different timeslots on a same set of frequencies. The first grant-free resource block and the second grant-free resource block can occur during different timeslots on different frequencies. The instance of user equipment can transmit a second grant-free transmission that comprises the data payload and a second pointer at the second grant-free resource block. The base station may receive the grant-free transmission transmitted by the instance of user equipment on the first grant-free resource block. A collision may be detected by the base station on the second grant-free resource block. The collision can result from the second grant-free transmission being received during a same timeslot and a same frequency as a third grant-free transmission from a second instance of user equipment. Based on the first pointer of the grant-free transmission, interference cancelation may be performed to subtract at least a portion of the grant-free transmission from the received collision to reconstruct the third grant-free transmission transmitted by the second instance of user equipment at the second grant-free resource block. The base station can be part of a 5G cellular network. Selecting the first grant-free resource block and selecting the second grant-free resource block may be performed randomly by the instance of user equipment. The grant-free transmission may include a second pointer to a third grant-free resource block. The third grant-free resource block may have occurred earlier in time than the grant-free resource block and the second grant-free resource block may occur later in time than the grant-free resource block.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 4A illustrates an embodiment of a one-way frequency-domain linked-list data structure.

FIG. 4B illustrates an embodiment of a two-way frequency-domain linked-list data structure.

FIG. 6A illustrates an embodiment of a one-way time-domain linked-list data structure.

FIG. 6B illustrates an embodiment of a two-way time-domain linked-list data structure.

DETAILED DESCRIPTION

Instances of UE are permitted to send GF transmission on allocated resource blocks. A resource block can refer to a timeslot and a number of subcarriers in the frequency domain, such as 12 subcarriers. In the time domain, such as for 5G, the time slot may be for 14 OFDM symbols. Resource blocks may also be applied to mini-slot transmissions instead of slot transmissions. (For the purposes of this document, "time slot" can be understood as including mini-slots.) The instance of UE can transmit the GF transmission without getting permission from the base station to transmit on a resource block allocated for GF transmissions. However, other instances of UE may also transmit on the same resource block. If two or more instances of UE transmit on the same resource block, a collision may occur, preventing the base station from properly receiving the two or more transmissions from the two or more instances of UE. In embodiments detailed herein, rather than transmitting a data payload using a single resource block, an instance of UE may be configured to transmit the same data payload on multiple resource blocks along with one or more points that refer to one or more of the other resource blocks on which the payload was transmitted. Such an arrangement not only can increase the likelihood that at least one of the transmissions will be successfully received by the base station, but also if the base station has a copy of the data that was received as part of the collision, the data involved in the collision can be processed and reconstructed to decipher the received data involved in the collision. As detailed herein, various arrangements for using pointers and indexes in relation to GF transmissions are disclosed.

Figure 1:
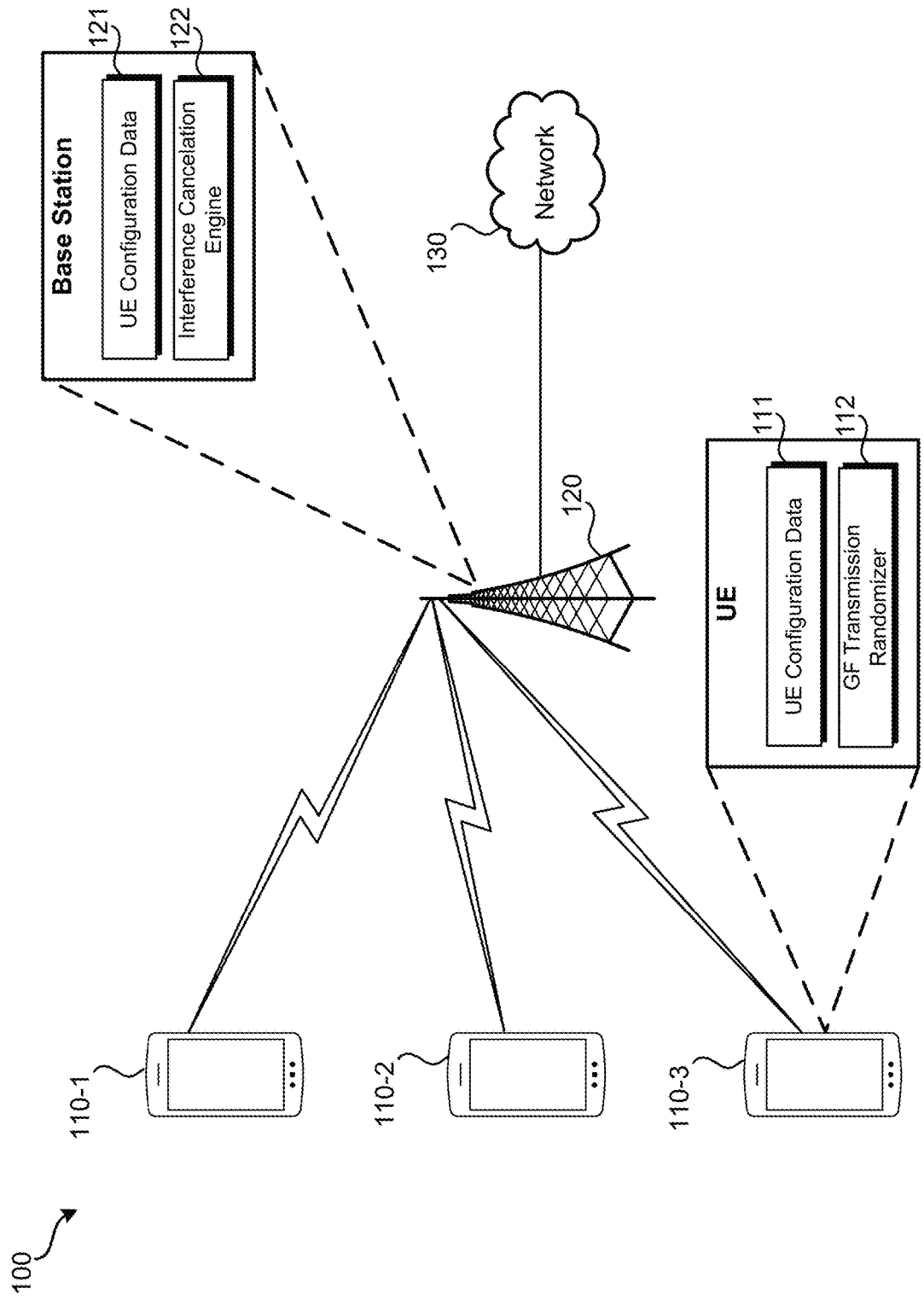
FIG. 1 illustrates an example of a cellular system in which multiple instances of user equipment are communicating with a base station.

FIG. 1 illustrates an embodiment of a system 100 in which multiple instances of UE are communicating with a base station of a cellular network. In system 100, UE 110 is present. Instances of user equipment may be forms of wireless electronic devices that can communicate with a cellular network, such as a 5G cellular network. Other forms of cellular networks are possible (e.g., 3G, 4G, or a later generation of cellular network). Wireless electronic devices may be cellphones, smartphones, computers, gaming devices, smart-home devices, smart sensors, etc.

Instances of UE 110 may have various components on-board. For instance, each instance of UE may have hardware, software, and/or firmware that permits communication with one or more types of wireless networks, such as 5G NR cellular networks. Additionally, UE 110 may have other components. For simplicity, several of such components are shown for only UE 110-3. For UE 110-3, UE configuration data 111 is stored using a non-transitory processor-readable medium, such as memory. UE configuration data 111 may be received from base station 120 and may dictate which resource blocks are reserved for GF transmissions and how such GF transmissions should be transmitted. UE configuration data 111 may define the number of times that a particular payload of data should be sent on different resource blocks. Further, UE configuration data 111 may define whether frequency and/or time should be randomized or if a consecutive group of transmissions (in either the frequency or time domain) are to be sent having the same payload. GF transmission randomizer 112, which can be implemented using a multi-purpose processor or a dedicated component, may be used to randomly select a resource block. By different instances of UE performing a randomized selection of resource blocks, the likelihood of collisions may be reduced.

Multiple instances of UE 110 may communicate with base station 120. Base station 120 may provide access to network 130 (which may be a private network (e.g., a cellular service provider's network, or a public network, such as the Internet) for UE that are currently communicating with base station 120. Base station 120 may be part of a cellular network, such as a 5G cellular network. Therefore, base station 120 may be a gNodeB. Base station 120 may have various hardware components found in a gNodeB. Base station 120 may have UE configuration data 121 stored using a non-transitory processor-readable medium. UE configuration data 121 may be transmitted to instances of UE 110 when UE 110 communicate with base station 120. Base station 120 may also have interference cancelation engine 122. Interference cancelation engine 122 may be able to resolve data involved in a collision if interference cancelation engine 122 has access to a copy of one of the instances of the transmitted messages involved in the collision (such as by performing successive interference cancelation).

Services in addition to network access may be provided, such as data reporting, telephone calls, text messaging, etc. Such services may rely on at least some packetized data being transmitted from the UE to the base station.

The wireless network of which base station 120 is a member, may support grant-free (GF) transmissions. For example, the 3GPP NR (New Radio) specification (also referred to as 5G) allows for GF uplink transmissions from UE to a base station. A GF transmission refers to a transmission that has not been previously scheduled from the UE to the base station. Rather, particular resource blocks, are reserved for grant free transmissions. A resource block refers to a defined time period occurring at a defined time (a time slot or mini-slot), on a defined frequency (a subcarrier group, such as of 12 subcarriers). Any UE may be permitted to transmit a GF transmission on such a resource block without first requesting and obtaining a reservation from base station 120.

Such an arrangement can decrease the amount of overhead and delay associated with scheduling a transmission between an instance of UE 110 and base station 120. However, since instances of UE 110 are not aware of if or when other instances of UE 110 are transmitting GF transmissions, collisions between transmissions are possible. A collision results when multiple instance of UE (e.g., UE 110-1 and 110-2) each transmit a GF transmission on a same resource block. Such a collision can result in base station 120 being unable to successfully decode or interpret the GF transmission from either instance of UE due to interference from the GF transmission from the other UE.

Figure 2:
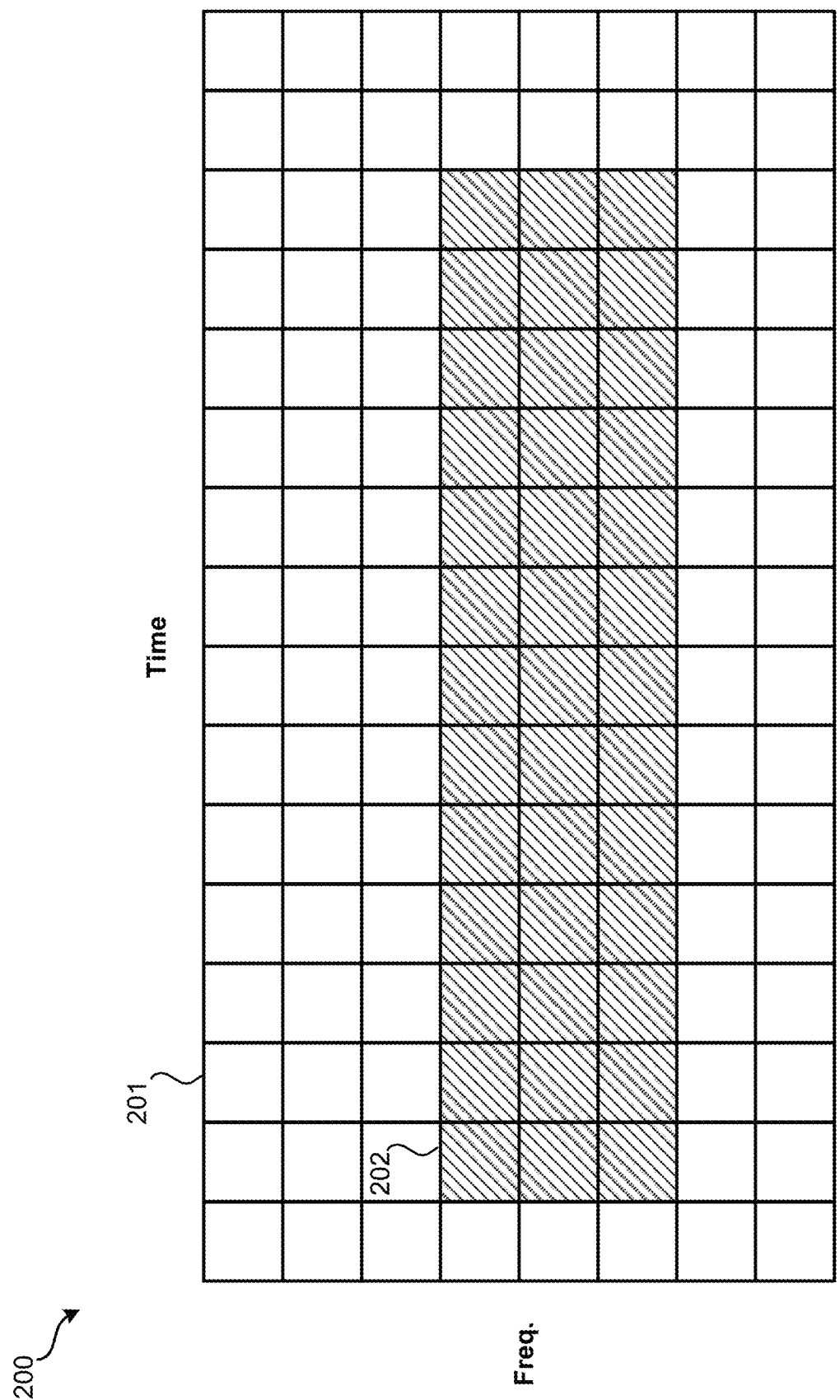
FIG. 2 illustrates grant-free resource blocks that may be available for the transmission of data to multiple instances of user equipment.

FIG. 2 illustrates an embodiment 200 of grant-free resource blocks that may be available for the transmission of data from multiple instances of user equipment to a base station. In embodiment 200, the y-axis represents different sub-carrier frequencies in the frequency domain and the x-axis represents different pre-defined time slots (or in 5G or other networks that support the technology, mini-slots). In FIG. 2, the shaded resource blocks, such as resource block 202, are examples of resource blocks during which instances of UE in communication with a base station are permitted to transmit grant-free transmissions. In FIG. 2, the blank resource blocks, such as resource block 201, are examples of resource blocks that are reserved for purposes other than grant-free transmissions. It should be understood that the illustrated number of grant-free resources, the number of time slots, and the number of resource blocks are for example purposes only.

Figure 3B:
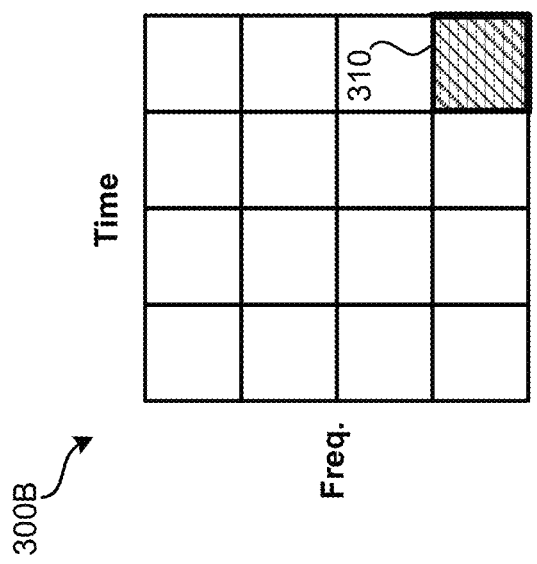
FIG. 3B illustrates an embodiment of a grant-free resource blocks in which multiple instances of user equipment have transmitting data and a collision has resulted.
Figure 3A:
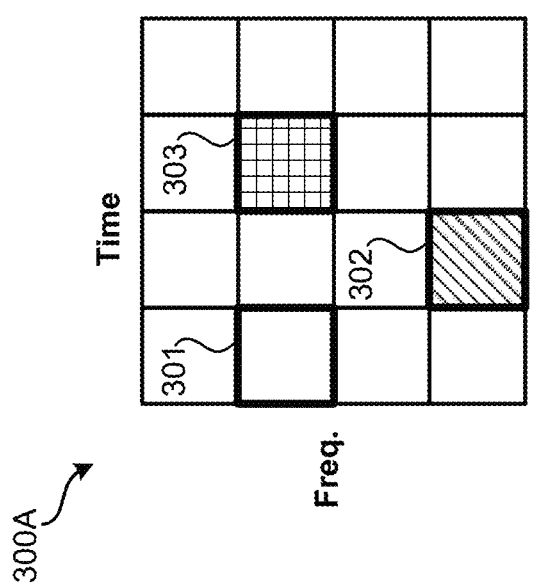
FIG. 3A illustrates an embodiment of a grant-free resource blocks in which multiple instances of user equipment are transmitting data.

FIG. 3A illustrates an embodiment 300A of resource blocks for grant-free transmissions in which multiple instances of user equipment have transmitted data. The specific resource block in which a UE sends a GF transmission may be randomly selected by the UE. Such random selection may help eliminate collisions between data transmitted by different UEs. Embodiment 300A represents when and on what sub-carrier frequencies is received by a base station. No UE transmitted a GF transmission in resource block 301; a first UE (e.g., UE 110-1) transmitted a GF transmission at resource block 302; and a second UE (e.g., UE 110-2) transmitted a GF transmission at resource block 303. Since the GF transmissions were transmitted on different resource blocks, there is no collision and the base station can be expected to receive both GF transmissions successfully.

In contrast, FIG. 3B illustrates an embodiment 300B of resource blocks for grant-free transmissions in which multiple instances of UE have transmitted data and a collision has resulted. In embodiment 300B, two UEs transmitted a GF transmission on resource block 310. Therefore, the base station receives both GF transmissions in the same time slot on the same set of sub-carrier frequencies. Data transmitted by each UE may be received but may be indecipherable by the base station without additional information. Therefore, unless additional information is provided, the GF transmission by each UE at resource block 310 may be lost.

Rather than transmitting a GF transmission once, a UE may perform "K" repetitions by sending the same GF transmission multiple times ("K" times). Some or all of these replicated GF transmissions may be linked to another GF transmission that includes the same data payload and use one or more pointers. Such replication may be performed in the frequency domain, the time domain, or both.

FIG. 4A illustrates an embodiment of a one-way frequency-domain linked-list data structure 400A. Data structure 400A represents multiple resource blocks in which GF transmissions are permitted. Each of the resource blocks in data structure 400A occur in a same timeslot, but on different sub-carrier frequencies. The UE transmits GF transmissions that have the same payload on resource blocks 401, 402, and 403. Each of these GF transmissions include a pointer value that refers to another resource block on which the same data payload was transmitted (the data payload is said to be "replicated"). The GF transmission transmitted by the UE at resource block 401 includes a pointer value (which is represented by arrow 411) that refers to resource block 402. The GF transmission transmitted by the UE at resource block 402 includes a pointer value (which is represented by arrow 412) that refers to resource block 403. The GF transmission transmitted by the UE at resource block 403 includes a pointer value (which is represented by arrow 413) that refers to resource block 403. By the GF transmission of resource block 403 referring to itself, this is an indication that the GF transmission of resource block 403 is a last GF transmission of the series of linked GF transmissions.

The specific number ("K") of repetitions GF transmissions sent by a UE may be based on a predefined value. For instance, a network or base station may have instructed the UE a number of times that a GF transmission should be replicated can be stored in the configuration data of the UE. The number of times a transmission is replicated may be varied based on the amount of GF transmissions being sent collectively by UE to a base station. The greater the number GF transmissions being sent by different instances of UE, the more replications that may be needed by each UE to increase the likelihood of a successful reception by the base station without a collision.

FIG. 4B illustrates an embodiment of a two-way frequency-domain linked-list data structure 400B. Data structure 400B represents multiple resource blocks in which GF transmissions are permitted. Each of the resource blocks in data structure 400A occur in a same timeslot, but on different set of sub-carrier frequencies. The UE transmits GF transmissions that have the same payload on resource blocks 421 and 422. Each of these GF transmissions includes two pointer values that refer to other resource blocks on which the same data payload was transmitted. The GF transmission transmitted by the UE at resource block 421 includes a first pointer value (which is represented by arrow 430) that refers to resource block 422. The GF transmission transmitted by the UE at resource block 421 also includes a second pointer value (which is represented by arrow 433) that refers back to resource block 421, indicating that no further resource block at a lower set of sub-carrier frequencies contains the replicated payload. The GF transmission transmitted by the UE at resource block 422 includes a first pointer value (which is represented by arrow 431) that refers to resource block 422, indicating that no further resource block at a higher set of sub-carrier frequencies in frequency domain contains the replicated payload. The GF transmission transmitted by the UE at resource block 422 also includes a second pointer value (which is represented by arrow 432) that refers back to resource block 421. Therefore, as long as a base station successfully receives one of the GF transmissions of resource block 421 and resource block 422, based on the included points, the base station can determine the other resource block on which the data payload was replicated.

Figure 5:
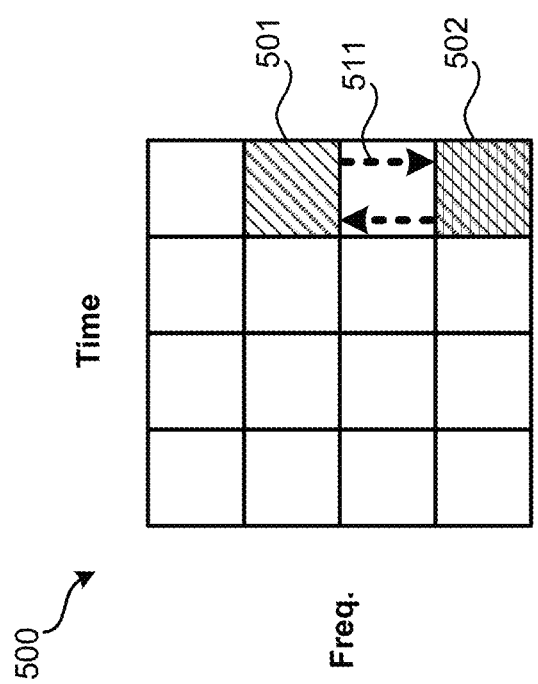
FIG. 5 illustrates an embodiment of a collision involving a two-way frequency-domain linked-list data structure.

FIG. 5 illustrates an embodiment 500 of a collision involving a two-way frequency-domain linked-list data structure. In embodiment 500, a GF transmission was transmitted by a first UE on resource block 501 and resource block 502. On resource block 501, only the first UE transmitted, thus there is no collision and the base station can properly receive and decode the GF transmission of resource block 501. Included in the GF transmission of resource block 501 is pointer 511, which points to resource block 502.

At resource block 502, the first UE transmitted the same data payload at resource block 501. Additionally, a second UE transmitted a different GF transmission at resource block 502, resulting in a collision as detected by the base station, thus rendering both of the GF transmissions of resource block 502 indecipherable by the base station (without additional information). Since the base station received information indicating that the same data payload of resource block 501 was transmitted on resource block 502 due to pointer 511, the base station may perform successive interference cancellation (SIC) to resolve the collision. The base station may effectively subtract the interference caused by the known content of the GF transmission of resource block 501 from the received data collision. By subtracting this interference, the base station may be able to successfully reconstruct the data payload of the second GF transmission from the second UE. The high level concept of SIC is a subtraction of two received signals, however, in practice, some signal processing techniques are needed before the subtraction. For instance, due to fading on different time slot or frequency dependent fading, some scaling may be needed before the subtraction process is performed.

While FIGS. 4A-5 were focused on the frequency domain, the concept may be applied and expanded to the time domain. FIG. 6A illustrates an embodiment of a one-way time-domain linked-list data structure. In embodiment 600A, the sub-carrier frequencies in frequency domain and the time slot varies for the multiple GF transmissions. Resource blocks to the right represent resource blocks occurring during later time slots. Therefore, the GF transmission transmitted at resource block 601 is transmitted on four time slots earlier than the GF transmission transmitted at resource block 602. In a one-way time-domain linked-list data structure, each GF transmission transmitted by a UE may include a pointer to a past resource block that includes a same data payload. The GF transmission of resource block 602 may include a pointer, represented by arrow 610, to the GF transmission of resource block 601. The GF transmission of resource block 603 may include a pointer, represented by arrow 611, to the GF transmission of resource block 602. The GF transmission of resource block 604 may include a pointer, represented by arrow 612, to the GF transmission of resource block 603. The GF transmission of resource block 605 may include a pointer, represented by arrow 613, to the GF transmission of resource block 604. Additionally, the GF transmission of resource block 605 may include an additional pointer indicating that no future GF transmission includes the same replicated data payload. In other embodiments, rather than pointers pointing to a past resource block, pointers may point to a future resource block, such as resource block 601 pointing to resource block 602.

In embodiment 600A, each GF transmission is transmitted on a random resource block that has a different timeslot and a different frequency. In other embodiments, multiple resource blocks having a same timeslot may be used. Additionally or alternatively, multiple resource blocks having a same sub-carrier frequencies in frequency domain may be used.

FIG. 6B illustrates an embodiment of a two-way time-domain linked-list data structure. In embodiment 600B, the frequency band and the time slot varies for the multiple GF transmissions. In a two-way time-domain linked-list data structure, each GF transmission transmitted by a UE may include two pointers: a first pointer to a past resource block that includes a same data payload and a second pointer to a future resource block that includes a same data payload. Since the UE may randomly select the resource blocks, resource blocks may be randomly selected in advance of when the resource block occurs, thus allowing a GF transmission to refer to a future resource block, such as a pointer (represented by arrow 628) in the GF transmission of resource block 602 referring to resource block 603.

The GF transmission of resource block 631 may include a first pointer, represented by arrow 629, to the GF transmission of resource block 632. The GF transmission of resource block 631 may include a second pointer, represented by arrow 630, indicating that the data payload was transmitted on no earlier resource blocks. The GF transmission of resource block 632 may include a first pointer, represented by arrow 628, to the GF transmission of resource block 633. The GF transmission of resource block 632 may include a second pointer, represented by arrow 621, indicating that the data payload was transmitted on resource block 631. The GF transmission of resource block 633 may include a first pointer, represented by arrow 627, to the GF transmission of resource block 634. The GF transmission of resource block 633 may include a second pointer, represented by arrow 622, indicating that the data payload was transmitted on resource block 632. The GF transmission of resource block 634 may include a first pointer, represented by arrow 626, to the GF transmission of resource block 635. The GF transmission of resource block 634 may include a second pointer, represented by arrow 623, indicating that the data payload was transmitted on resource block 633. The GF transmission of resource block 635 may include a first pointer, represented by arrow 625, indicating that no future resource block contains a replicated version of the data payload. The GF transmission of resource block 635 may include a second pointer, represented by arrow 624, indicating that the data payload was transmitted on resource block 634.

Figure 6C:
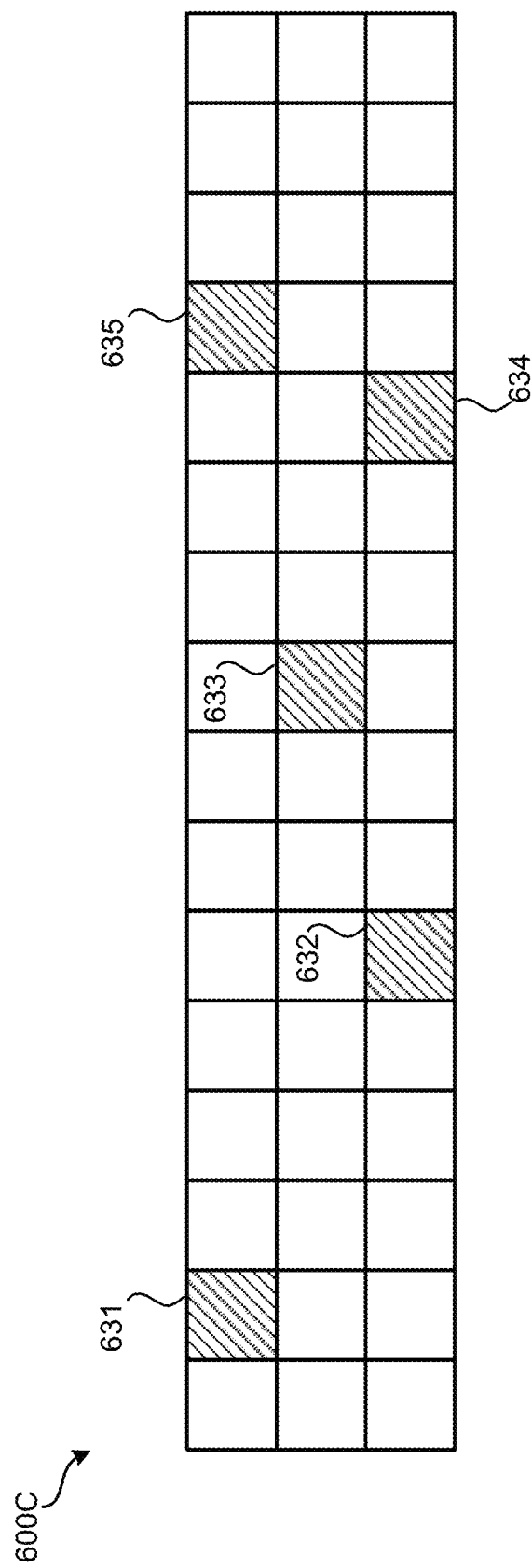
FIG. 6C illustrates an embodiment of a time-domain linked pseudorandom code linked data structure.

FIG. 6C illustrates an embodiment 600C of a time-domain linked pseudorandom code linked data structure. In embodiment 600C, resource blocks 631-635 each include the same payload of data. However, pointers are not present in the data transmitted on each of these resource blocks. Rather, both the instance of UE and the base station have stored a pseudo-random code that periodically repeats. This pseudo-random code defines a pattern of resource blocks that varies in the time-domain and frequency-domain, such as illustrated in FIG. 6C. In other embodiments, the pattern may vary in only the frequency domain or only the time domain.

The initial pseudo-random code may be created and stored by the base station and transmitted to the instance of UE. The instance of UE may store the pseudo-random code and use it to repeat a transmission of data for GF transmissions. Alternatively, the initial pseudo-random code may be created by the instance of UE and transmitted to the base station. The base station may store an indication of the pseudorandom code. When a collision occurs, the base station may access the pseudorandom code to determine other resource blocks on which the UE is expected to transmit the same data as on the resource block on which the collision occurred.

The use of a pseudorandom code may have the advantage that data related to pointers does not need to be transmitted, thus decreases the amount of overhead that needs to be transmitted on resource blocks. When a UE moves and begins communicating with a different base station, the base station may provide a new pseudorandom code, the UE may provide a message indicative of its current pseudorandom code, or the wireless network may provide the different base station with an indication of the pseudorandom code.

Figure 7:
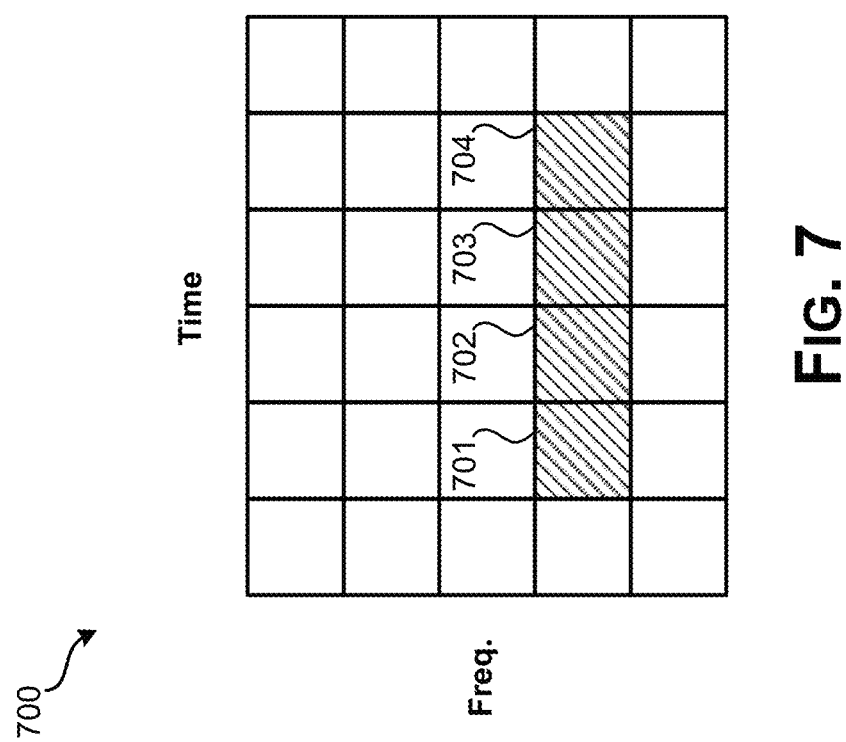
FIG. 7 illustrates an embodiment of a consecutive index time-domain data structure.

FIG. 7 illustrates an embodiment 700 of a consecutive index time-domain data structure. For example in some embodiments, only the time slot may be variable and the sub-carrier frequencies may be fixed. In such embodiments, rather than using a pointer, the replicated GF transmissions may be sent on temporally-consecutive resource blocks on the same subcarrier frequency along with an index value. Each GF transmission may be numbered and may include an indication of a total number of transmissions, thus the base station may be able to determine the number of replicated GF transmissions that were sent before and after the successfully received GF transmission. In embodiment 700, a same payload is transmitted on resource blocks 701, 702, 703, 704. Each of these transmissions may include a different index and may indicate the total number of transmissions. For instance, the data transmitted at resource block 701 may indicate index 1 of 4; resource block 702 may indicate index 2 of 4; resource block 703 may indicate index 3 of 4; and resource block 704 may indicate index 4 of 4. In some embodiments, the base station may have a stored indication of the number replicated GF transmissions that may be sent for various types of UE. Therefore, if a successfully-received GF transmission is labeled with a particular value, the base station may be able to determine the number of replicated GF transmissions occurring before and after the successfully received GF transmission. For example, in embodiment 700, the predefined number of values is four. In still other embodiments, adjacent sub-carrier frequencies may be used instead of consecutive time slots (or mini-slots).

Figure 8:
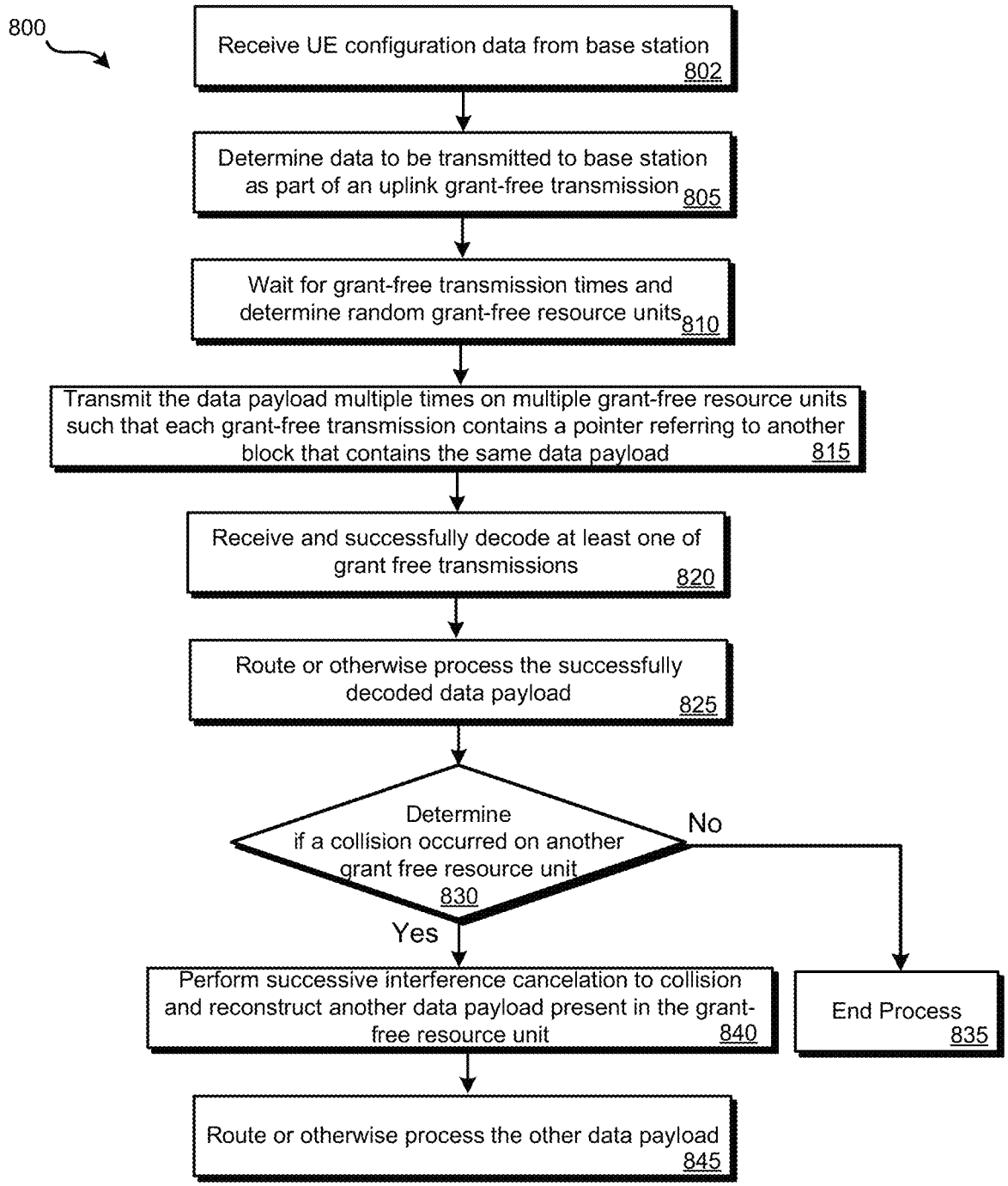
FIG. 8 illustrates an embodiment of a method for using a linked-list data structure to correct for grant-free transmission collisions.

Various methods may be performed using the arrangements of FIGS. 1-7. FIG. 8 illustrates an embodiment of a method for using a linked-list data structure to correct for grant-free transmission collisions. Method 800 may be performed by system 100, which can include UE and a base station.

At block 802, instances of UE in communication with a base station may be provided UE configuration data that defines how the instances of user equipment can perform GF transmissions. The UE configuration data may define: which resource blocks are allocated for GF transmissions; the number of times a message should be sent as a GF transmission; whether frequency should be randomized; whether timeslot should be randomized; and whether unidirectional or bi-directional pointers are to be included in the uplink GF transmissions. In some embodiments, the UE configuration data is received at an earlier time from another base station or is stored onto the UE as part of an initial configuration (e.g., performed at manufacture).

At block 805, a first UE may determine it has data that is to be transmitted to a base station as a GF transmission. In response to this determination, at block 810, the first UE may need to wait until a next scheduled time period when grant-free resource blocks are present. Additionally, at block 805, the first UE may randomly select multiple resource blocks. The UE may have data locally stored that indicates the time slots and sub-carrier frequencies of available GF resource blocks. Such data may have been previously provided to the UE by the base station, by the cellular network, or stored as part of the UE's configuration data. In some embodiments, the resource blocks vary only in frequency; in other embodiments, the resource blocks vary only in time; and in still other embodiments, the resource blocks vary in both time and frequency. The number of resource blocks selected may be at least two. The base station may have previously provided the first UE with a number of repetitions to perform. Alternatively, the first UE may have a stored default number of repetitions to transmit.

At block 815, the GF transmission may be transmitted multiple times on different resource blocks. Each GF transmission may be a replica of the other GF transmissions sent at block 815. The only difference between the GF transmissions may be the included pointers. Each GF transmission may include one, two, or more than two pointers. A pointer may point to a next GF transmission (e.g., higher set of sub-carrier frequencies, later in time, lower set of sub-carrier frequencies, and/or earlier in time). Two pointers may be present to point to the next and previous GF transmissions. A pointer may also be self-referential to the GF transmission in which it is included to indicate that the GF transmission is a first or last GF transmission of a group of replicated GF transmissions.

Of the multiple GF transmissions sent on the different set of sub-carrier frequencies, different time slots, or both, at least one may be received and decoded by the base station without a collision occurring with another GF transmission from another UE at block 820. The data payload received and successfully decoded at block 820 may be routed to an external network (e.g., the Internet), via some other private or public network, or otherwise processed at block 825.

At block 830, the base station may determine whether a GF uplink transmission collision occurred on another resource block that is linked to the successfully decoded GF transmission via one or more pointers included in the one or more GF transmissions of block 820. A collision may be identified by the base station determining that multiple GF transmissions have been received, but that the amount of interference is too great to interpret the contents of the multiple received GF transmissions without further information. If block 830 is determined in the negative and there are no collisions, method 800 may end at block 835.

At block 840, if block 830 is determined in the positive, method 800 may proceed to block 840. At block 840, successive interference cancelation (SIC) may be performed to subtract the data payload of the successfully decoded GF transmission of block 820 from the collision signal. By subtracting the successfully decoded GF transmission of block 820, the base station may be able to reconstruct a GF transmission transmitted by a second UE that happened to transmit on the same resource block as a replicated GF transmission from the first UE. The data payload of the GF transmission from the second UE that was successfully reconstructed at block 840 may be routed to an external network (e.g., the Internet), via some other private or public network, or otherwise processed at block 845.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for performing grant-free uplink transmissions, the method comprising:
   determining, by a user equipment (UE), data that is to be transmitted using a grant-free uplink transmission to a base station of a cellular network;
   selecting, by the UE, a first grant-free resource block from a plurality of grant-free resource blocks, wherein:
      each grant-free resource block defines a subcarrier frequency and timeslot for data to be transmitted by UE without a reservation;
   selecting, by the UE, a second grant-free resource block from the plurality of grant-free resource blocks;
   selecting, by the UE, a third grant-free resource block from the plurality of grant-free resource blocks;
   transmitting, by the UE, a first grant-free transmission that comprises a data payload, a first pointer, and a second pointer at the first grant-free resource block, wherein:
      the first pointer is indicative of a first end of a chain of linked grant-free transmissions;
      the second pointer refers to the second grant-free resource block;
   transmitting, by the UE, a second grant-free transmission that comprises the data payload, a third pointer, and a fourth pointer at the second grant-free resource block, wherein:
      the third pointer refers to the first grant-free resource block;
      the fourth pointer refers to the third grant-free resource block; and
   transmitting, by the UE, a third grant-free transmission that comprises the data payload, a fifth pointer, at the third grant-free resource block, wherein:
      the fifth pointer refers to the second grant-free resource block.

2. The method of claim 1, wherein the first grant-free resource block, the second grant-free resource block, and the third grant-free resource block each occur at a same time.

3. The method of claim 1, wherein the first grant-free resource block, the second grant-free resource block, and the third grant-free resource block each occur during different timeslots on different frequencies.

4. The method of claim 1, wherein the UE transmits the first grant-free transmission, the second grant-free transmission, and the third grant-free transmission according to the 5G New Radio (NR) communication protocol.

5. The method of claim 1, wherein selecting the first grant-free resource block, selecting the second grant-free resource block, and selecting the third grant-free resource block are performed randomly by the UE.

6. The method of claim 1, wherein the third grant-free transmission comprises a sixth pointer that is indicative of a second end of the chain of the linked grant-free transmissions.

7. The method of claim 6, wherein the sixth pointer refers to the third grant-free resource block.

8. The method of claim 1, wherein the third grant-free transmission comprises a sixth pointer that refers to a fourth grant-free resource block.

9. A system for performing grant-free uplink transmissions, the system comprising:
   a user equipment (UE), configured to:
      determine data that is to be transmitted using a grant-free uplink transmission to a base station of a cellular network;
      select a first grant-free resource block from a plurality of grant-free resource blocks, wherein:
         each grant-free resource block defines a subcarrier frequency and timeslot for data to be transmitted by UE without a reservation;
      select a second grant-free resource block from the plurality of grant-free resource blocks;
      select a third grant-free resource block from the plurality of grant-free resource blocks;
      transmit a first grant-free transmission that comprises a data payload, a first pointer, and a second pointer at the first grant-free resource block, wherein:
         the first pointer is indicative of a first end of a chain of linked grant-free transmissions;
         the second pointer refers to the second grant-free resource block;
      transmit a second grant-free transmission that comprises the data payload, a third pointer, and a fourth pointer at the second grant-free resource block, wherein:
         the third pointer refers to the first grant-free resource block;
         the fourth pointer refers to the third grant-free resource block; and
      transmit a third grant-free transmission that comprises the data payload, a fifth pointer, at the third grant-free resource block, wherein:
         the fifth pointer refers to the second grant-free resource block.

10. The system of claim 9, further comprising the base station of the cellular network that receives the first grant-free transmission, the second grant-free transmission, and the third grant-free transmission.

11. The system of claim 10, wherein the base station, UE, and cellular network operate according to the 5G New Radio (NR) cellular communication standard.

12. The system of claim 9, wherein the first grant-free resource block, the second grant-free resource block, and the third grant-free resource block each occur at a same time.

13. The system of claim 9, wherein the first grant-free resource block, the second grant-free resource block, and the third grant-free resource block each occur during different timeslots on different frequencies.

14. The system of claim 9, wherein the UE being configured to select the first grant-free resource block, the second grant-free resource block, and the third grant-free resource block is performed randomly.

15. The system of claim 9, wherein the third grant-free transmission comprises a sixth pointer that is indicative of a second end of the chain of the linked grant-free transmissions.

16. The system of claim 15, wherein the sixth pointer refers to the third grant-free resource block.

17. The system of claim 9, wherein the third grant-free transmission comprises a sixth pointer that refers to a fourth grant-free resource block.

18. A non-transitory processor-readable medium for a cellular device comprising processor-readable instructions configured to cause one or more processors of a first user equipment (UE) to:
   determine data that is to be transmitted using a grant-free uplink transmission to a base station of a cellular network;
   select a first grant-free resource block from a plurality of grant-free resource blocks, wherein:
      each grant-free resource block defines a subcarrier frequency and timeslot for data to be transmitted by UE without a reservation;

select a second grant-free resource block from the plurality of grant-free resource blocks;

select a third grant-free resource block from the plurality of grant-free resource blocks;

transmit a first grant-free transmission that comprises a data payload, a first pointer, and a second pointer at the first grant-free resource block, wherein:
  the first pointer is indicative of a first end of a chain of linked grant-free transmissions;
  the second pointer refers to the second grant-free resource block;

transmit a second grant-free transmission that comprises the data payload, a third pointer, and a fourth pointer at the second grant-free resource block, wherein:
  the third pointer refers to the first grant-free resource block;
  the fourth pointer refers to the third grant-free resource block; and transmit a third grant-free transmission that comprises the data payload, a fifth pointer, at the third grant-free resource block, wherein:
  the fifth pointer refers to the second grant-free resource block.

19. The non-transitory processor-readable medium of claim 18, wherein the third grant-free transmission comprises a sixth pointer that is indicative of a second end of the chain of the linked grant-free transmissions.

20. The non-transitory processor-readable medium of claim 18, wherein the third grant-free transmission comprises a sixth pointer that refers to a fourth grant-free resource block.

* * * * *